Oct. 30, 1923.

H. B. BAGG 1,472,037

SCALE

Original Filed Aug. 7, 1918

INVENTOR
Hollis B Bagg
BY
Phillips Sawyer Rice Kennedy
ATTORNEYS

Patented Oct. 30, 1923.

1,472,037

UNITED STATES PATENT OFFICE.

HOLLIS B. BAGG, OF WATERTOWN, CONNECTICUT, ASSIGNOR TO SCOVILL MANUFACTURING COMPANY, OF WATERBURY, CONNECTICUT, A CORPORATION OF CONNECTICUT.

SCALE.

Original application filed August 7, 1918, Serial No. 248,679. Divided and this application filed April 24, 1920. Serial No. 376,202.

*To all whom it may concern:*

Be it known that I, HOLLIS B. BAGG, a citizen of the United States, residing at Watertown, county of Litchfield, and State of Connecticut, have invented certain new and useful Improvements in Scales, fully described and represented in the following specification and the accompanying drawings, forming a part of the same.

This invention relates to improvements in self-adjusting bearings, and particularly to such bearings for use in scales. The present application is a division of an application filed August 7, 1918, Serial No. 248,679.

In scales employing knife edge pivots, there are liable to be irregularities in the finish of the pivot itself or in the bearing block thereof or in both. Correct weighing requires absolute accuracy in the construction of pivot and bearing, and unless the irregularities or inaccuracies referred to are compensated for, true weights will not be obtained, the variations from absolute accuracy depending, of course, on the character and extent of the inaccuracies. Attempts have been made to compensate for the inaccuracies referred to by pivotally mounting the bearing blocks for the pivot, so as to allow them to have an adjusting movement. While better results are obtained from bearing blocks mounted in this way than from rigid blocks, inaccuracies occur which will not be compensated for by this method of mounting the bearing blocks.

It is the principal object of the present invention to produce an improved self-adjusting bearing which may be employed in connection with knife edge pivots to compensate for irregularities.

With this and other objects not specifically referred to in view, the invention consists in certain constructions and in certain parts, improvements and combinations as will be hereinafter fully described and then specifically set forth.

In the accompanying drawings,—

Figure 1:
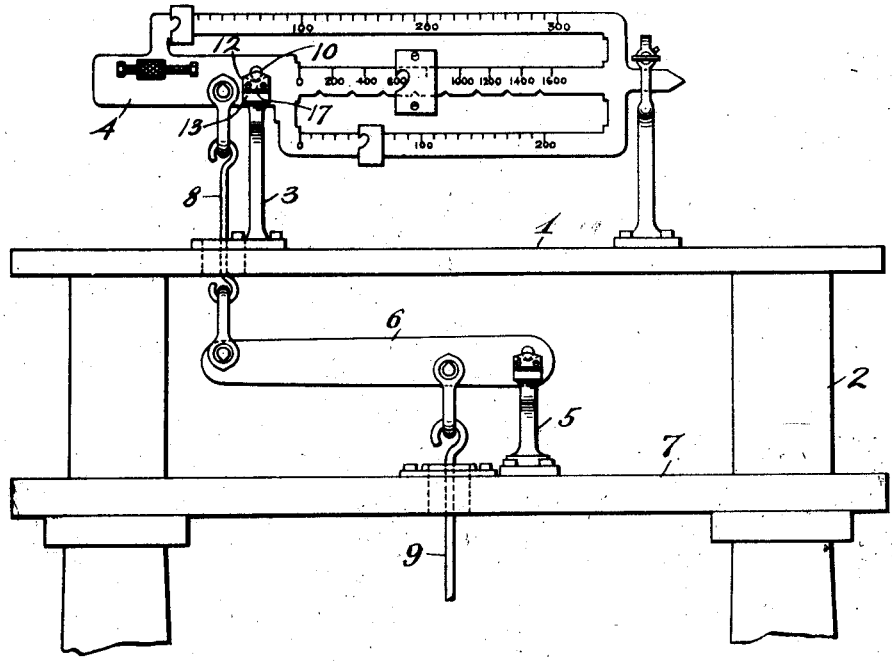
Figure 1 is a side elevation of so much of a scale embodying the invention as is necessary to an understanding thereof.

Referring to the drawings, the improved self-adjusting bearing is shown as adapted to use in a scale. A pillar cap 1 is supported on two pillars 2 and carries a stand 3 for the scale beam 4. A second stand 5 for the shelf lever is carried on a shelf 7 supported by the pillar 2. A connection 8 connects the shelf lever and the scale beam and 9 indicates a connection adapted to connect the shelf lever to the scale lever system.

While the self-adjusting bearing may be used for the pivotal connection of both the scale beam and shelf lever, the bearing shown in detail is for the former.

The invention includes a knife edge pivot and a support therefor. Although capable of various constructions, in the embodiment illustrated, a knife edge pivot 10 extends out from either side of the scale beam 4. The knife edge pivot rests in recesses 11 formed in support blocks 12, the best results being attained when these recesses are V shaped as shown.

Figure 2:
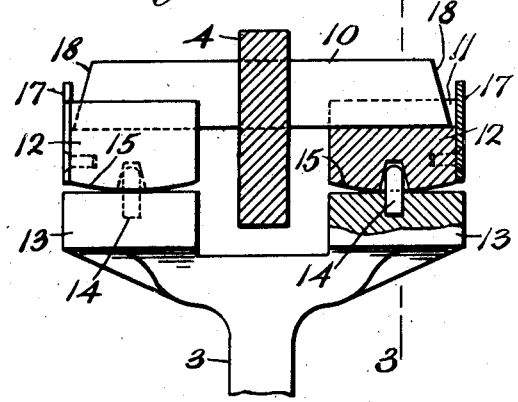
Figure 2 is a detail view, on a large scale, partly in section, illustrating the construction of an improved self-adjusting bearing which is employed in connection with the knife edge pivot.
Figure 3:
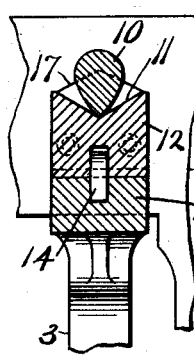
Figure 3 is a section on the line 3—3 of Figure 2.
Figure 4:
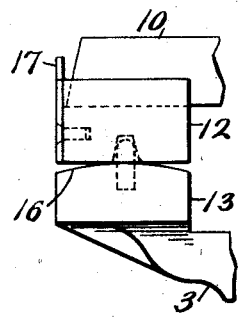
Figure 4 illustrates a modified construction of the self-adjusting bearing.

In the structure embodying the invention in its entirety, the support is mounted to have adjusting movements in two directions angular with respect to each other. This may be accomplished, for example, by mounting the support to have a rocking movement to adjust for irregularities in the pivot, and a swinging movement, angular to the rocking movement, to adjust for other irregularities. Although capable of various constructions, as here shown, the support blocks 12 are carried on bases 13 formed by forking the upper end of stand 3, as clearly appears in Fig. 2. The blocks 12 are connected to the bases 13 by means of pivots 14, this construction allowing the swinging movement referred to. The rocking movement, in the particular construction shown, is had by rounding one of the meeting faces of the supporting base. In the construction illustrated in Fig. 2, the under faces 15 of the blocks 12 are rounded, while in the construction shown in Fig. 4, the upper faces 16 of the bases 13 are rounded. The same result is obtained by either construction, but the construction illustrated in Fig. 2 is regarded as preferable from a manufacturing standpoint. It will be observed that the rounding is at the end portions only of the supporting blocks or bases, and that the meeting faces of the support and base are in contact between the rounded portions. This gives a firm seating of the support on the base and prevents any sidewise movement which would tend to increase the friction by throwing the pivot bar out of its true position.

The invention also includes means for preventing sidewise shift of the pivot with respect to the bearing. In the construction shown, this is accomplished by closing the pivot recesses in the support by plates 17 which are mounted on the support itself and which move with the support. To prevent endwise shifting of the pivot, it should be made long enough so that its ends will lie very close to the closing plates, and to reduce the friction to a minimum the end of the pivot should be beveled back, as shown at 18.

It will be understood that the invention is not to be confined to the particular construction herein shown and described, but that changes and variations may be made therein without departing from the invention.

What is claimed is:

1. In a bearing, the combination with a knife edge pivot bar, of a support therefor including two recessed blocks in which the pivot engages, a base on which the support rests, one of the meeting faces of said parts being rounded to permit a rocking movement, whereby the support is enabled to have a rocking movement with respect to the base, and pivot pins on one of the meeting faces of said parts received by recesses in the other faces, whereby the support may have a pivotal movement with respect to the base.

2. In a bearing, the combination with a kinfe edge pivot bar, of a support therefor, including a pair of recessed blocks in which the pivot engages, a base on which the support rests, the base having flat surfaces for the blocks and carrying pivot pins, the faces of the blocks being rounded whereby the support has a rocking movement and having recesses for receiving said pivot pins, the faces of the blocks and the support being in contact between the rounded portions, and recess closing plates carried by said blocks.

In testimony whereof, I have hereunto set my hand.

HOLLIS B. BAGG.